(12) United States Patent
Xiang et al.

(10) Patent No.: US 11,164,323 B2
(45) Date of Patent: Nov. 2, 2021

(54) METHOD FOR OBTAINING IMAGE TRACKING POINTS AND DEVICE AND STORAGE MEDIUM THEREOF

(71) Applicant: TENCENT TECHNOLOGY (SHENZHEN) COMPANY LIMITED, Shenzhen (CN)

(72) Inventors: Xiaoming Xiang, Shenzhen (CN); Hao Xu, Shenzhen (CN); Ting Lu, Shenzhen (CN); Chengzhuo Zou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 89 days.

(21) Appl. No.: 16/679,128

(22) Filed: Nov. 8, 2019

(65) Prior Publication Data

US 2020/0074646 A1 Mar. 5, 2020

Related U.S. Application Data

(63) Continuation of application No. PCT/CN2018/103585, filed on Aug. 31, 2018.

(30) Foreign Application Priority Data

Sep. 4, 2017 (CN) .......................... 201710788265.6

(51) Int. Cl.
*G06T 7/00* (2017.01)
*G06T 7/246* (2017.01)
(Continued)

(52) U.S. Cl.
CPC ............ *G06T 7/248* (2017.01); *G06T 3/0068* (2013.01); *G06T 3/40* (2013.01); *G06T 7/337* (2017.01);
(Continued)

(58) Field of Classification Search
CPC .......... G06T 7/248; G06T 7/74; G06T 7/337; G06T 3/0068; G06T 3/40; G06T 2207/10016; G06K 9/62
See application file for complete search history.

(56) References Cited

U.S. PATENT DOCUMENTS

2002/0154820 A1* 10/2002 Kaneko ..................... G06T 7/20
382/209
2005/0215879 A1 9/2005 Chuanggui
(Continued)

FOREIGN PATENT DOCUMENTS

CN 1957373 A 5/2007
CN 102402691 A * 4/2012
(Continued)

OTHER PUBLICATIONS

The State Intellectual Property Office of the People's Republic of China (SIPO) Office Action 1 for 201710788265.6 dated Jun. 29, 2020 19 Pages (including translation).
(Continued)

*Primary Examiner* — Chan S Park
*Assistant Examiner* — Claude Noel Y Zanetsie
(74) *Attorney, Agent, or Firm* — Anova Law Group, PLLC

(57) ABSTRACT

The present disclosure provides a method for obtaining image tracking points. The method can be applied to an image tracking point obtaining device, the method includes obtaining, when a current video frame comprises a first image of a target object, a second image of the target object and determining a position of a second feature point on the second image; obtaining, on the first image, a first feature point corresponding to the second feature point; obtaining a first area to which the first feature point belongs in the first image, and obtaining a second area to which the second feature point belongs in the second image; and determining
(Continued)

the first feature point as a tracking point of the current video frame when an image similarity between the first area and the second area meets a screening condition.

20 Claims, 8 Drawing Sheets

(51) Int. Cl.
G06T 7/73 (2017.01)
G06T 7/33 (2017.01)
G06T 3/00 (2006.01)
G06T 3/40 (2006.01)

(52) U.S. Cl.
CPC ...... *G06T 7/74* (2017.01); *G06T 2207/10016* (2013.01)

(56) References Cited

U.S. PATENT DOCUMENTS

| | | |
|---|---|---|
| 2010/0188580 A1 | 7/2010 | Paschalakis et al. |
| 2014/0101195 A1 | 4/2014 | Li et al. |
| 2014/0217178 A1 | 8/2014 | Zhou et al. |
| 2015/0098607 A1* | 4/2015 | Chow .................. G06T 19/006 382/103 |
| 2018/0098057 A1* | 4/2018 | Heo .................. G06K 9/00261 |
| 2018/0158199 A1* | 6/2018 | Wang .................. G06K 9/6211 |

FOREIGN PATENT DOCUMENTS

| | | |
|---|---|---|
| CN | 102402691 A | 4/2012 |
| CN | 103632374 A | 3/2014 |
| CN | 103971400 A | 8/2014 |
| CN | 103996184 A | 8/2014 |
| CN | 105809654 A | 7/2016 |
| CN | 106650965 A | 5/2017 |
| CN | 106683113 A | 5/2017 |
| CN | 106920247 A | 7/2017 |
| CN | 107633526 A | 1/2018 |

OTHER PUBLICATIONS

The World Intellectual Property Organization (WIPO) International Search Report for PCT/CN2018/103585 dated Nov. 27, 2018 6 Pages (including translation).
The State Intellectual Property Office of the People's Republic of China (SIPO) Office Action 2 for for 201710788265.6 dated Apr. 13, 2021 12 Pages (including translation).

* cited by examiner

METHOD FOR OBTAINING IMAGE TRACKING POINTS AND DEVICE AND STORAGE MEDIUM THEREOF

RELATED APPLICATIONS

This application claims priority to PCT Application No. PCT/CN2018/103,585, filed on Aug. 31, 2018, which in turn claims priority to China Patent Application No. 201710788265.6, filed with the Chinese Patent Office on Sep. 4, 2017 and entitled "METHOD FOR OBTAINING IMAGE TRACKING POINTS AND DEVICE, AND STORAGE MEDIUM.", the two applications are both incorporated herein by reference in their entirety.

FIELD OF THE TECHNOLOGY

This application relates to the field of computer technologies, and in particular, to an method for obtaining image tracking points and related device and a storage medium.

BACKGROUND OF THE DISCLOSURE

Augmented Reality (AR) is a technology with applications that may calculate a position of a target object in a taken image in real time and then adding virtual content such as a virtual image and a video at the corresponding image position. Based on AR, a virtual scenario can be combined with a real environment, and effective interaction can be performed. Currently, an AR scenario is mainly implemented based on an image recognition technology. In other words, by using the image recognition technology, an image object that needs to be overlaid with virtual content is recognized in video frames captured by a camera apparatus, then positions of the image object in the video frames are determined, and the virtual content is overlaid according to the determined positions. Currently, one of the most important steps in the AR technology is the tracking of an image object. In various applications, when a user moves fast or shakes, tracking of the image objects fails due to a great difference between continuous video frames.

SUMMARY

Embodiments of this application provide an method for obtaining image tracking points and device, and a storage medium.

One aspect of the present disclosure provides a method for obtaining image tracking points. The method can be applied to an image tracking point obtaining device, the method includes obtaining, when a current video frame comprises a first image of a target object, a second image of the target object and determining a position of a second feature point marked on the second image; marking, on the first image, a first feature point corresponding to the second feature point; obtaining a first area to which the first feature point belongs in the first image, and obtaining a second area to which the second feature point belongs in the second image; and determining the first feature point as a tracking point of the current video frame when an image similarity between the first area and the second area meets a screening condition.

Another aspect of the present disclosure provides a device for obtaining image tracking points. The device includes a memory and a processor, the memory storing computer readable storage instructions. When executed by the processor, the computer readable storage instructions cause the processor to perform the following steps: obtaining, when a current video frame comprises a first image of a target object, a second image of the target object and determining a position of a second feature point marked on the second image; marking, in the first image, a first feature point corresponding to the second feature point; obtaining a first area to which the first feature point belongs in the first image, and obtaining a second area to which the second feature point belongs in the second image; and determining the first feature point as a tracking point of the current video frame when an image similarity between the first area and the second area meets a screening condition.

Another aspect of the present disclosure provides A non-transitory computer readable storage medium, storing computer readable storage instructions. When executed by one or more processors, the computer readable storage instructions causing the one or more processors to perform the following steps: obtaining, when a current video frame comprises a first image of a target object, a second image of the target object and determining a position of a second feature point marked on the second image; marking, on the first image, a first feature point corresponding to the second feature point; obtaining a first area to which the first feature point belongs in the first image, and obtaining a second area to which the second feature point belongs in the second image; and determining the first feature point as a tracking point of the current video frame when an image similarity between the first area and the second area meets a screening condition.

Details of one or more embodiments of this application are proposed in the following accompanying drawings and description. Other features, objectives, and advantages of this application will become clear from the specification, accompanying drawings, and claims.

BRIEF DESCRIPTION OF THE DRAWINGS

In order to illustrate the technical solutions in the embodiments of this application or the prior art more clearly, the accompanying drawings required for describing the embodiment or the prior art are introduced briefly in the following. It is apparent that the accompanying drawings in the following description are only some embodiments of this application. A person of ordinary skill in the art can obtain other drawings according to the accompanying drawings without creative efforts.

DESCRIPTION OF EMBODIMENTS

The technical solutions in the embodiments of this application are described clearly and completely below with reference to the accompanying drawings in the embodiments of this application. Obviously, the described embodiments are merely some, rather than all, of the embodiments of this application. Based on the embodiments in this application, all other embodiments obtained by a person of ordinary skill in the art without creative efforts belong to the protection scope of this application.

Figure 1:
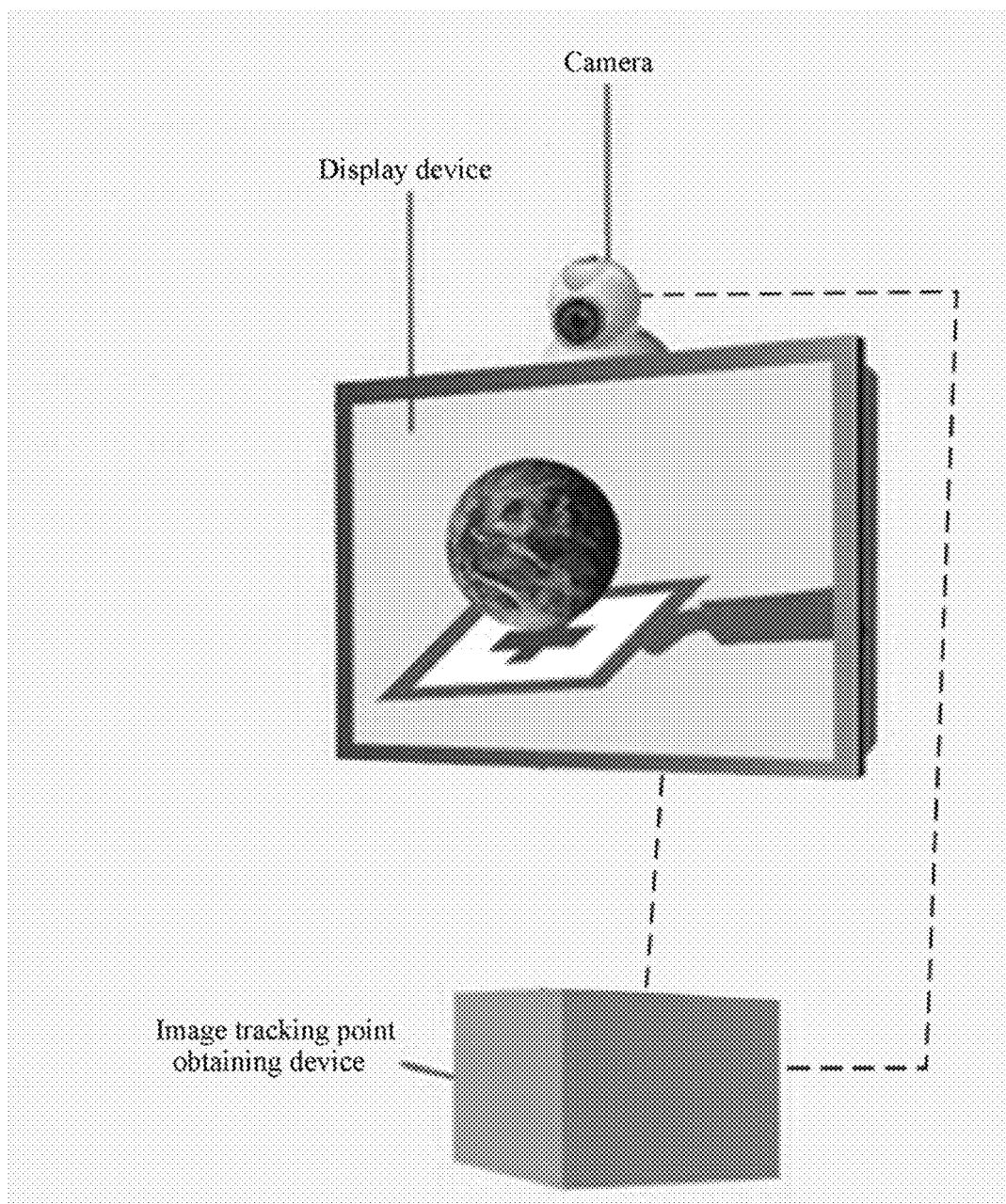
FIG. 1 is a diagram of an example of an image tracking point obtaining scenario according to an embodiment of this application.

FIG. 1 is a diagram of an example of an image tracking point obtaining scenario according to an embodiment of this application. In this diagram of an AR scenario of image tracking point obtaining, a display device, a camera, and an image tracking point obtaining device are included. The image tracking point obtaining device may be communicatively connected to the display device and the camera. For example, a video frame is obtained through the camera, the video frame is displayed on the display device, and virtual information (such as an object, a picture, a video, and a sound) is also displayed on the display device, to implement combination of virtual reality and reality. In the embodiment of this application, when a current video frame obtained through a camera includes a first image of a target object, the image tracking point obtaining device obtains a second image of the target object and determines a position of a second feature point marked on the second image; a first feature point corresponding to the second feature point is marked on the first image; a first area to which the first feature point belongs in the first image is obtained, and a second area to which the second feature point belongs in the second image is obtained; the image tracking point obtaining device determines the first feature point as a tracking point of the current video frame when an image similarity between the first area and the second area meets a screening condition. By comparing the areas to which the two feature points belong, the tracking point of the video frame can be determined more accurately, thereby improving the accuracy of tracking the target object in certain scenarios.

In one embodiment of this application, the display device and the camera may also be modules imbedded in the image tracking point obtaining device. For example, the image tracking point obtaining device may be a mobile phone, intelligent glasses, a navigation device, an AR device, and the like.

The method for obtaining image tracking points provided in the embodiment of this application is described in detail below with reference to FIG. 2 to FIG. 8.

Figure 2:
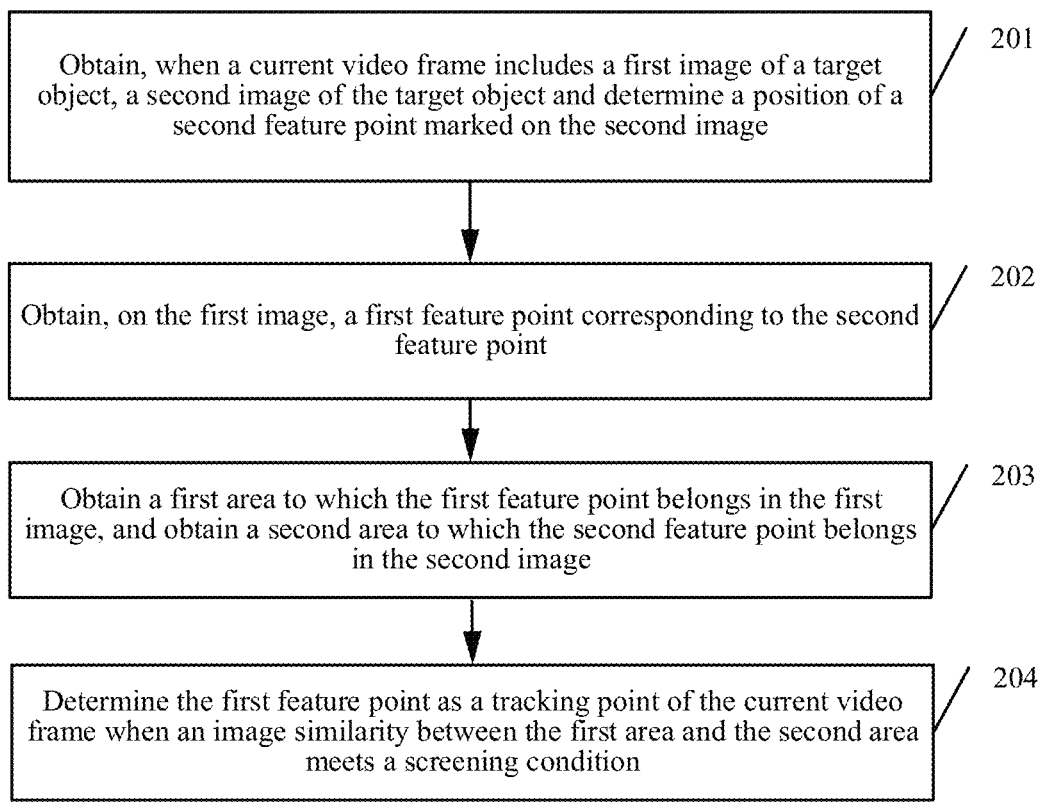
FIG. 2 is a schematic flowchart of an method for obtaining image tracking points according to an embodiment of this application.

FIG. 2 is a schematic flowchart of an method for obtaining image tracking points according to an embodiment of this application. As shown in FIG. 2, the method according to the embodiment of this application may include the following step 201 to step 204.

201: Obtain, when a current video frame includes a first image of a target object, a second image of the target object and determine a position of a second feature point marked on the second image.

Specifically, when the image tracking point obtaining device determines that the current video frame includes the first image of the target object, it may be the case where it is recognized, for the first time, that the current video frame includes first image. In this case, the solution in the embodiment of this application is used for determining a tracking point of the current video frame. Alternatively, it may be the case where it is recognized, not for the first time, that the current video frame includes the first image; in this case, the solution in the embodiment of this application is used for supplementing tracking points in the current video frame. In some embodiments, the current video frame is obtained by the image tracking point obtaining device through the camera. In this case, the image tracking point obtaining device obtains the second image of the target object and determines the position of the second feature point marked on the second image. The second image is an image whose position and size are aligned with those of the first image in the video frame. By determining the position of the second feature point in the second image, the first feature point of the first image can be marked, thereby determining the tracking point of the current video frame.

Further, when the image tracking point obtaining device recognizes that the current video frame includes the first image of the target object, the position of the first image in the video frame can be determined.

202: Mark, in the first image, a first feature point corresponding to the second feature point.

Specifically, the image tracking point obtaining device can determine the position of the first image in the video frame, and the positions and sizes of the second image and the first image are aligned. Therefore, the first feature point corresponding to the second feature point may be marked on the first image according to the position of the second feature point determined in step 201. Further, the image tracking point obtaining device calculates coordinates of the first feature point in the first image.

203: Obtain a first area to which the first feature point belongs in the first image, and obtain a second area to which the second feature point belongs in the second image.

204: Determine the first feature point as a tracking point of the current video frame when an image similarity between the first area and the second area meets a screening condition.

In step 203 and step 204, the image tracking point obtaining device may compare areas to determine whether the marked first feature point in step 204 is correct. If the marked first feature point is correct, the first feature point can be determined as the tracking point of the current video frame. In this way, the accuracy of determining the tracking point can be improved.

In this embodiment, the first area to which the first feature point belongs and the second area to which the second feature point belongs may be customized. The size of the first area and the size of the second area are not limited in the embodiment of this application. For example, the image tracking point obtaining device may determine the area to which the first feature point belongs by using the position of the first feature point as the center of the first area. Alternatively, the area to which the first feature point belongs may be determined by using the first feature point as a particular preset orientation of the first area.

Further, if the size of the first area is the same as that of the second area, the position of the second feature point in the second area is the same as position of the first feature point in the first area.

One feature point correspondingly belongs to one area. For example, the position of the first feature point is determined according to the position of a second feature point, and it can be appreciated that one first feature point corresponds to one second feature point. Therefore, when multiple first feature points are marked on the first image, in step 203, for each first feature point, an area to which the first feature point belongs is obtained, and a second area to which a second feature point corresponding to the first feature point belongs is obtained. Then, when step 204 is performed, it is determined whether the first area to which each first feature point belongs and the second area to which the second feature point corresponding to the first feature point belongs meets the screening condition.

In some embodiments, the size of the first area is equal to the size of the second area. In this case, step 204 is specifically implemented as follows: obtaining an image similarity between the first area and the second area; if the image similarity between the first area and the second area is greater than a first similarity threshold, determining the first feature point as the tracking point of the current video frame. The image tracking point obtaining device may calculate the image similarity between the first area and the second area by means of normalized cross correlation (NCC). For example, it is assumed that the size of the image of the first area is 10*10, and the size of the image of the second area is 10*10. A small window T with a size of 2*2 is created, where 10 represents the quantity of image pixels. A first sub-image of the first area and a second sub-image of the second area are separately obtained from the same positions in the first area and the second area according to the small window T. A grayscale correlation value between the first sub-image and the second sub-image is calculated through a correlation function. The image of the first area and the image of the second area are traversed from top to bottom and from left to right, to record grayscale correlation values of corresponding sub-image positions, and the maximum grayscale correlation value is the image similarity between the first area and the second area.

In other embodiments, the size of the first area is greater than the size of the second area. In this case, step 204 is specifically implemented as follows: determining multiple reference areas from the first area, a size of each reference area in the multiple reference areas being equal to the size of the second area; obtaining an image similarity between each reference area and the second area; and determining the first feature point as the tracking point of the current video frame if there is a first reference area, of which an image similarity with the second area is greater than a second similarity threshold, in the multiple reference areas. Every two reference areas in the multiple reference areas may have or do not have an overlapping area, which is not limited in the embodiment of this application.

In the embodiment of this application, the image tracking point obtaining device obtains, when an obtained current video frame includes a first image of a target object, a second image of the target object and determines a position of a second feature point marked on the second image; a first feature point corresponding to the second feature point is marked on the first image; a first area to which the first feature point belongs in the first image is obtained, and a second area to which the second feature point belongs in the second image is obtained; and the image tracking point obtaining device determines the first feature point as a tracking point of the current video frame when an image similarity between the first area and the second area meets a screening condition. By comparing the areas to which the two feature points belong, the tracking point of the video frame can be determined more accurately, thereby improving the accuracy of tracking the target object.

Figure 3:
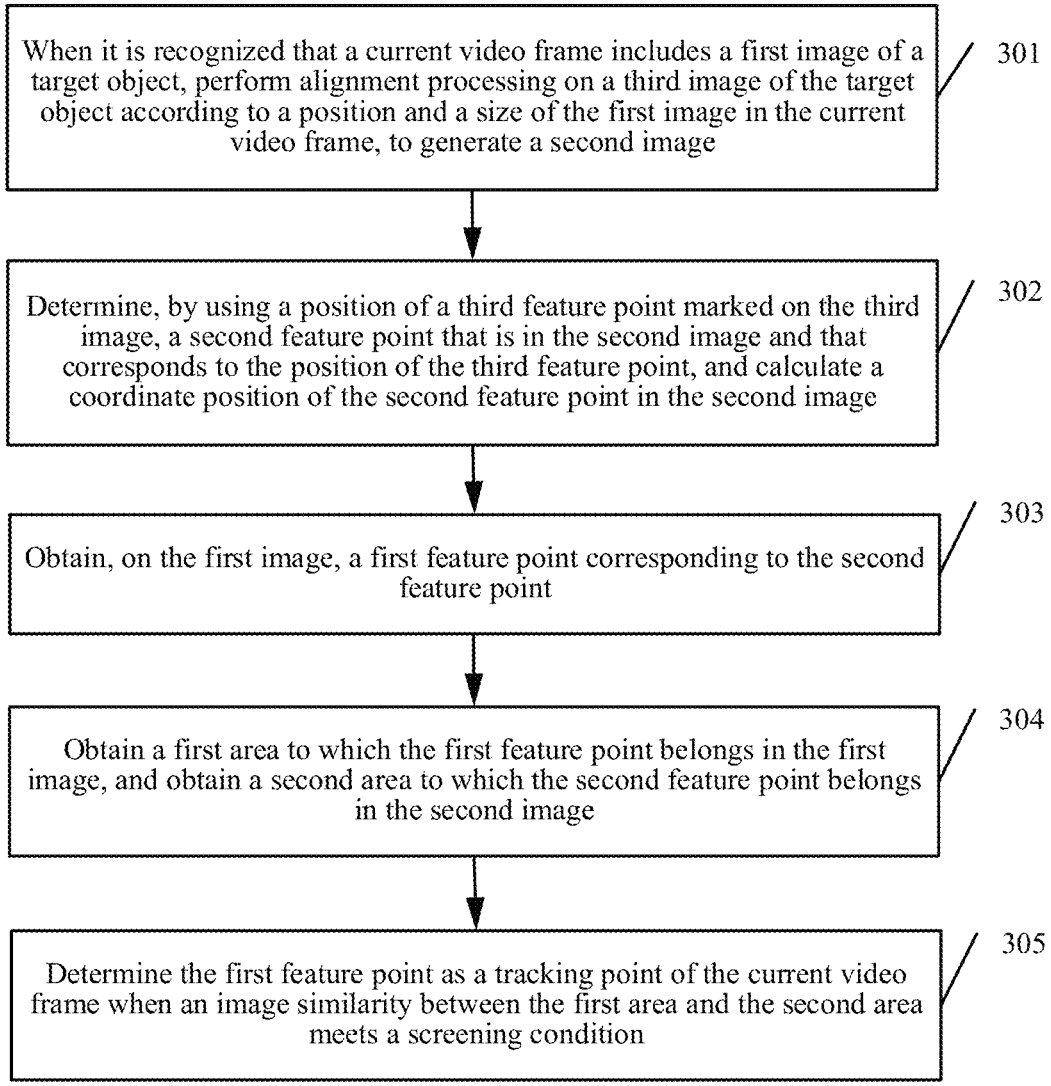
FIG. 3 is a schematic flowchart of another method for obtaining image tracking points according to an embodiment of this application.

Refer to FIG. 3, which is a schematic flowchart of a method for obtaining image tracking points according to an embodiment of this application. As shown in FIG. 3, the method according to the embodiment of this application may include the following step 301 to step 305.

301: When it is recognized that a current video frame includes a first image of a target object, perform alignment processing on a third image of the target object according to a position and a size of the first image in the current video frame, to generate a second image.

Specifically, when an image tracking point obtaining device recognizes that the current video frame includes the first image, first, according to the target object included in the first image, a third image including the target object is obtained. The first image and the third image are both images including the target object. For example, if the target object is a photo, the first image is an image of the photo in a video frame during shooting for the photo, and the third image is an electronic image of the photo. For another example, if the target object is a globe, the first image is an image of the globe in a video frame during image shooting for the globe; and the third image is an electronic image of the globe.

Secondly, when recognizing the first image in the current video frame, the image tracking point obtaining device may further determine the position and size of the first image in the current video frame. In this way, the image tracking point obtaining device performs alignment processing on the third image of the target object according to the position and size of the first image in the current video frame, to generate the second image. Specifically, a position of a third feature point marked in the third image is determined first; then, an alignment process for aligning the third image with the first image is determined according to the position and the size of the first image in the video frame; and finally, alignment processing is performed on the third image based on the first image and the alignment process, to generate the second image. For example, according to the determined alignment process, an angle of the third image is adjusted by using a central point and profile points of the third image as base points, so that the angle of the third image is consistent with that of the first image, and the size of the third image is adjusted according to the size of the first image.

For example, when it is determined that the target object is recognized in the current video frame, a homography matrix for alignment of the third image and the first image can be determined through the last step of the target object recognition. In this way, after alignment processing is performed on the third image according to the homography matrix, the second image is generated. A size of the second image is the same as the size of the first image, and an angle of the second image is the same as or close to (when there is an error in homography matrix calculation) an angle of the first image in the current video frame.

In some embodiments, the current video frame is obtained by the image tracking point obtaining device through a camera. In some embodiments, when the image tracking point obtaining device recognizes, for the first time, that the current video frame includes the first image, step 301 is performed.

Further, the recognition, for the first time, that the current video frame includes the first image may be that the image tracking point obtaining device recognizes, for the first time, that the current video frame includes the first image after the camera is turned on. Alternatively, the recognition, for the first time, that the current video frame includes the first image may be that the image tracking point obtaining device does not recognize the first image in the previous video frame (or N consecutive video frames prior to the current video frame, where N is a positive integer) and recognizes the first image in the current video frame. Alternatively, if it is preset that a moment corresponding to the current video frame is a current moment and a period from a first moment earlier than the current moment to the current moment (excluding the current moment) is a first time period, the recognition, for the first time, that the current video frame includes the first image may be that the image tracking point obtaining device does not recognize the first image in the first time period, and recognizes the first image in the current video frame. The above description is merely examples, and the case of recognition, for the first time, that the current video frame includes the first image is not limited in the embodiment of this application.

In this embodiment, the image tracking point obtaining device may recognize the target object in the current video frame by using a recognition algorithm. For example, the recognition algorithm may be a feature point matching algorithm based on Oriented Brief (ORB for short, which is an image feature detection operator). In this algorithm, ORB features of the third image and the current video frame are extracted first; then, matching is performed on the features of the third image and the current video frame by using a Brute-Force (BF) algorithm or a Fast_Library_for_Approximate_Nearest_Neighbors (FLNN) algorithm, to obtain a matching result; finally, exterior points are filtered out from the matching result by using a Random Sample Consensus (ransac) algorithm, and when the quantity of interior points after the exterior points are filtered out meets a requirement, it is determined that the target object is recognized in the current video frame.

Further, the image tracking point obtaining device may determine the position and the size of the first image in the video frame by using a recognition algorithm, so that the image tracking point obtaining device can conveniently determine the alignment process for the first image and the third image.

In addition, the image tracking point obtaining device stores object identifiers of multiple objects, and an object identifier is used for uniquely identifying an object. For example, the object identifier may be a number, a serial number, or the like. Moreover, the image tracking point obtaining device may obtain, according to an object identifier, a third image corresponding to the object identifier. The third image corresponding to the object identifier represents that the third image includes an object corresponding to the object identifier. For example, in the embodiment of this application, when the image tracking point obtaining device determines that the first image of the target object is recognized, a target object identifier of the target object is determined, and then a third image corresponding to the target object identifier is obtained according to the target object identifier.

302: Determine, by using a position of a third feature point marked on the third image, a second feature point that is on the second image and that corresponds to the position of the third feature point, and calculate coordinates of the second feature point in the second image.

Specifically, after determining the alignment process, the image tracking point obtaining device transforms, by using the position of the third feature point marked on the third image, the position of the third feature point according to the alignment process, and marks, in the second image, the second feature point corresponding to the third feature point according to the transformed position. Further, the image tracking point obtaining device calculates the coordinate position of the second feature point in the second image. One third feature point of the third image corresponds to one coordinate position, and coordinates obtained after transformation of coordinates of one third feature point is coordinates of the second feature point corresponding to the third feature point.

303: Mark, in the first image, a first feature point corresponding to the second feature point.

Specifically, the image tracking point obtaining device can determine the position of the first image in the video frame, and the positions and sizes of the second image and the first image are aligned. Therefore, the first feature point corresponding to the second feature point may be marked on the first image according to the coordinate position of the second feature point determined in step 302. Further, the image tracking point obtaining device calculates coordinates of the first feature point in the first image.

It may be appreciated that, for a third feature point in the third image, the second image includes a second feature point corresponding to the third feature point, and the first image includes a first feature point corresponding to the third feature point.

304: Obtain a first area to which the first feature point belongs in the first image, and obtain a second area to which the second feature point belongs in the second image.

305: Determine the first feature point as a tracking point of the current video frame when an image similarity between the first area and the second area meets a screening condition.

In step 304 and step 305, the image tracking point obtaining device may compare areas to determine whether the marked first feature point in step 303 is correct. If the marked first feature point is correct, the first feature point can be determined as the tracking point of the current video frame. In this way, the accuracy of determining the tracking point can be improved.

In some embodiments, the first area to which the first feature point belongs and the second area to which the second feature point belongs may be customized. The size of the first area and the size of the second area are not limited in the embodiment of this application. For example, the image tracking point obtaining device may determine the area to which the first feature point belongs by using the position of the first feature point as the center of the first area. Alternatively, the area to which the first feature point belongs may be determined by using the first feature point as a particular preset orientation of the first area.

Further, if the size of the first area is the same as that of the second area, the position of the second feature point in the second area is the same as position of the first feature point in the first area.

In the embodiment of this application, the size of the first area is equal to the size of the second area. In this case, step 305 is specifically implemented as follows: obtaining an image similarity between the first area and the second area; if the image similarity between the first area and the second area is greater than a first similarity threshold, determining the first feature point as the tracking point of the current video frame. The image tracking point obtaining device may calculate the image similarity between the first area and the second area by means of normalized cross correlation (NCC). The algorithm for calculating the image similarity between the first area and the second area may further include: sum of squared difference (SDD), sum of absolute difference (SAD), and enhanced correlation coefficient (ECC). The first similarity threshold may be customized, which is not limited in the embodiment of this application.

In another optional solution, the size of the first area is greater than the size of the second area. In this case, step 305 is specifically implemented as follows: determining multiple reference areas from the first area, a size of each reference area in the multiple reference areas being equal to the size of the second area; obtaining an image similarity between each reference area and the second area; and determining the first feature point as the tracking point of the current video frame if there is a first reference area, of which an image similarity with the second area is greater than a second similarity threshold, in the multiple reference areas. Every two reference areas in the multiple reference areas may have or do not have an overlapping area, which is not limited in the embodiment of this application.

When the image tracking point obtaining device obtains the third image, the step of determining the position of the third feature point marked in the third image in step 301 may be a process of marking each third feature point in the third image and calculating coordinates of each third feature point in the third image, or may be a process of obtaining a position of each third feature point already marked in the third image.

In one embodiment, marking the third feature point in the third image and calculating the coordinate position of the third feature point in the third image may be implemented through the following steps A1 to A3.

A1: Determine positions of multiple reference points in the third image of the target object and a distinction degree of each reference point in the multiple reference points by using a feature point extraction algorithm.

Specifically, the image tracking point obtaining device finds multiple reference points from the third image by using the feature point extraction algorithm. The reference points herein are feature points extracted by using a feature extraction algorithm. In the embodiment of this application, feature points mentioned in step A1 in the embodiment of this application are referred to as reference points. Next, by using the feature point extraction algorithm, a distinction degree of each reference point in the multiple reference points may further be obtained. The distinction degree herein is used for representing a feature response value calculated from each reference point by using the algorithm, and the feature response value is used for representing the magnitude of differences between the reference point and other surrounding reference points. For example, the distinction degree may also be represented by a quantized value or a measurement value, which is not limited in the embodiment of this application.

In some embodiments, the feature point extraction algorithm may include, but is not limited to, a Harris corner algorithm, a features from accelerated segment test (FAST) algorithm, an adaptive and generic accelerated segment test (AGAST) algorithm, a good feature to track (GFTT) algorithm, and the like.

A2: Determine a reference point with a highest distinction degree in the multiple reference points as the third feature point, and calculate coordinates of the third feature point in the third image.

Specifically, the image tracking point obtaining device select some most representative reference points from the multiple reference points as multiple third features of the third image. A solution for picking up a third feature point may be as follows: The image tracking point obtaining device determines a reference point with a highest distinction degree in the multiple reference points as the third feature point, and determines the position of the third feature point according to positions of the reference points determined in step A1. For example, coordinates of the reference point with the highest distinction degree in the third image is determined as coordinates of the third feature point in the third image.

A3: Remove, from the multiple reference points, the reference point with the highest distinction degree and a reference point whose distance to coordinates of the reference point with the highest distinction degree is less than a pixel threshold, and perform the step of determining a reference point with a highest distinction degree in the multiple reference points as the third feature point, and calculating coordinates of the third feature point in the third image.

Specifically, to further determine other third feature points, the image tracking point obtaining device further needs to perform step A3 after performing step A2. First, the image tracking point obtaining device removes the reference point with the highest distinction degree (that is, the reference point determined as the third feature point in step A2). Then, a reference point whose distance to the position of the reference point with the highest distinction degree is less than a pixel threshold is determined. For example, the pixel threshold is 10 pixels; the image tracking point obtaining device searches the multiple reference points for a reference point whose distance to the coordinate position of the reference point with the highest distinction degree is less than 10 pixels, and removes the found reference point. In this way, the reference points are scattered in the third image. Finally, the image tracking point obtaining device performs step A2 in the current remaining reference points, to determine a reference point with a highest distinction degree in the multiple reference points as a third feature point, and calculate coordinates of the third feature point in the third image, thereby determining another third feature point of the third image.

In some embodiments, after determining the third feature points, the image tracking point obtaining device may further perform sub-pixel accuracy processing, so that the third feature points are more accurate. The sub-pixel accuracy refers to subdivision between two adjacent pixels. An input value is usually ½, ⅓, or ¼. This means that each pixel is divided into smaller units, so that an interpolation algorithm is implemented on these smaller units. For example, if ¼ is selected, it is equivalent that in calculation, each pixel is considered as four pixels in both a horizontal direction and a lateral direction. Therefore, if sub-pixel accuracy of ¼ is selected for an image of 5×5 pixels, it is equivalent that a 20×20 discrete lattice is created. The image tracking point obtaining device may determine the coordinate position of the third feature point on the discrete lattice obtained after sub-pixel accuracy processing.

In some embodiments, the image tracking point obtaining device may set the quantity of third feature points needing to be determined. In one embodiment, the quantity of third feature points may be determined according to the quantity of reference points extracted in step A1. For example, the quantity of reference points determined in step A1 is 100, the quantity of third feature points is set to 50. In another optional solution, the image tracking point obtaining device may customize the quantity of third feature points. In this way, the image tracking point obtaining device may stop performing step A2 and step A3 when determined third feature points meet the required quantity.

In some embodiments, the image tracking point obtaining device may stop performing step A2 and step A3 when there is no remaining reference point.

In an optional implementation solution, the image tracking point obtaining device adjusts the size of the third image of the target object according to the size of the current video frame, so that the size of the current video frame is closer to a size message of the third image. For example, when it is recognized, for the first time, that the current video frame includes the first image of the target object, the size of the third image is adjusted after the third image of the target object is obtained and before step A1 is performed, to facilitate recognition of the first image.

For example, the image tracking point obtaining device may adjust a fixed aspect ratio of the third image, so that the magnitude of a pixel area of the third image is closer to the magnitude of a pixel area of the current video frame. If an original size of the third image is 1024×768 and a size of the current video frame is 1280*960, because the aspect ratio of the third image is the same as that of the current video frame, the third image may be enlarged, and adjusted to be 1280*960. If the original size of the third image is 1280×800 and the size of the current video frame is 640*480, because the aspect ratio of the third image is different from that of the current video frame, the third image may be reduced according to the aspect ratio of the third image, and adjusted to be 640*400. The embodiment of this application neither limits the adjustment manner for the third image, nor limits the relationship between the size of the adjusted third image and the size of the current video frame. For example, the size of the adjusted third image may be greater than, equal to, or less than the size of the current video frame.

Figure 4:
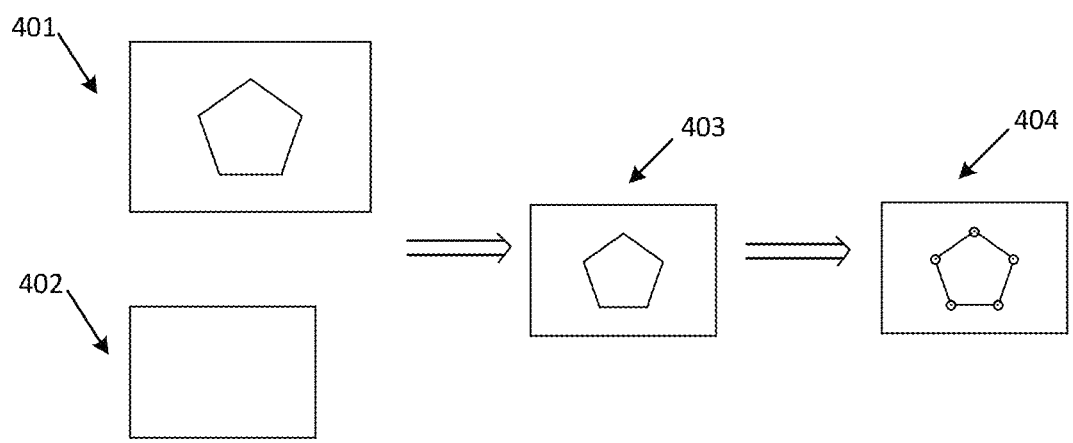
FIG. 4 is a diagram of an example of determining a third feature point according to an embodiment of this application.

In another example FIG. 4 is a diagram of an example of determining a third feature point according to an embodiment of this application. As shown in FIG. 4, 401 represents a third image and 402 represents a video frame. It can be seen clearly that the size of 401 is larger than the size of the video frame. In the diagram of this example, the third image 401 is adjusted according to the size of the video frame 402, to obtain an adjusted third image 403. Then, through step A1 to step A3, a third feature point is marked in the adjusted third image 403, where 404 in FIG. 4 represents an image in which the third feature point has been marked, and each circle represents a marked third feature point.

Figure 5:
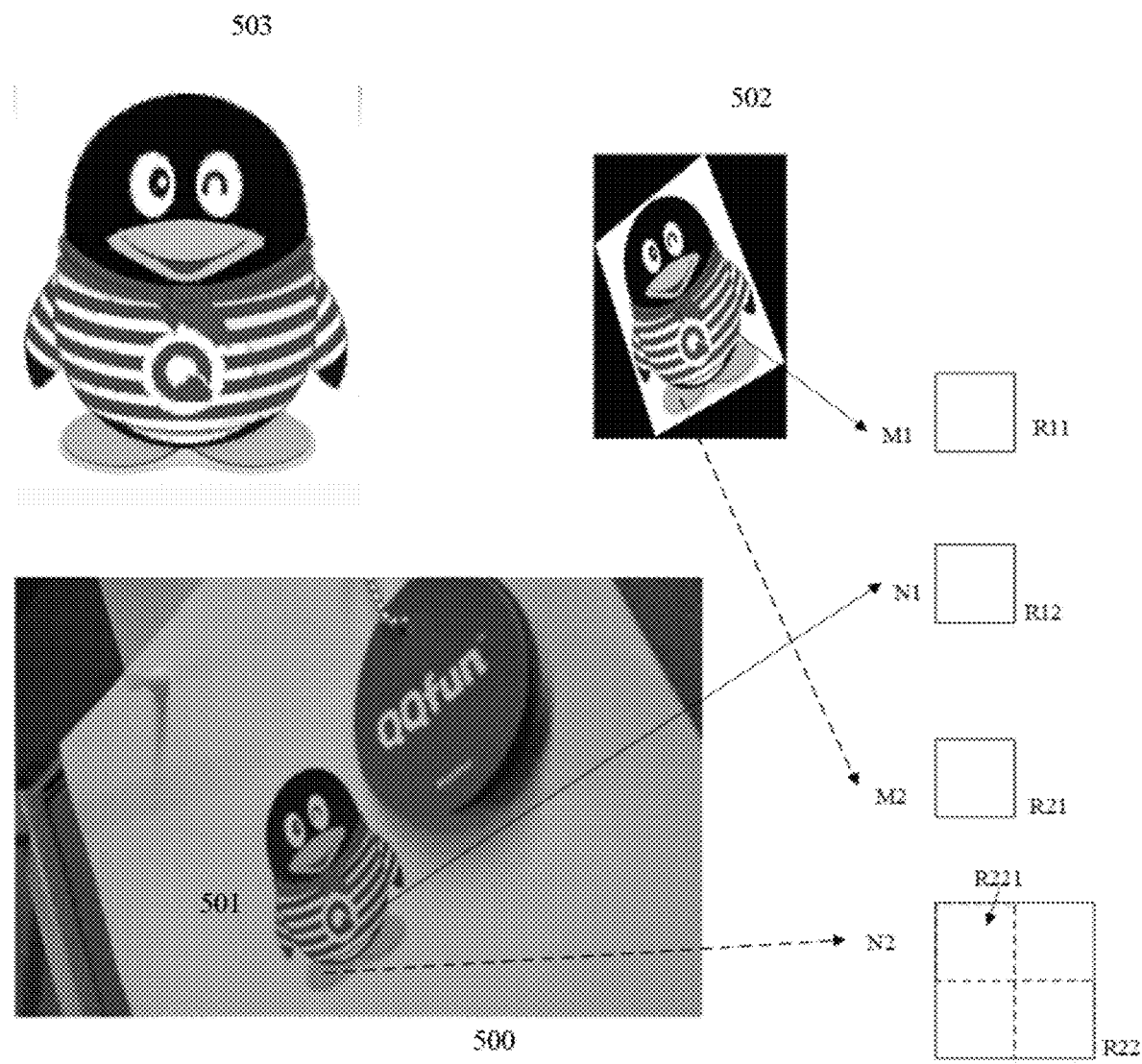
FIG. 5 is a diagram of an area determining example according to an embodiment of this application.

Step 301 to step 305 are described by using an example. FIG. 5 is a diagram of an area determining example according to an embodiment of this application. As shown in FIG. 5, 500 represents a video frame including a first image, 501 represents the included first image, 503 represents a third image, 502 represents a second image, and a target object is a penguin. After an alignment process for aligning the third image with the first image is determined through step 303, the second image 502 may be generated. It can be seen that, the size and angle of the second image 502 are close to those of the first image in the video frame 501.

In an optional area comparison solution, M1 represents a second feature point in the second image 502, and N1 represents a first feature point that is on the first image 501 and that corresponds to M1. A second area to which M1 belongs is R11, and a first area to which N1 belongs is R12. R11 and R12 have the same size herein. For example, R11 and R12 are both square areas with a size of 10*10. In some embodiments, M1 and N1 may be central points of the square areas, or M1 and N1 may be points at the same orientation in the square areas. First, an image similarity between R11 and R12 is calculated; next, if the image similarity between R11 and R12 is greater than a first similarity threshold, N1 is determined as a tracking point of the video frame 500. In some embodiments, if the image similarity between R11 and R12 is not greater than the first similarity threshold, it is determined that N1 is not the tracking point of the video frame 500.

In another optional area comparison solution, M2 represents another second feature point in the second image 502, and N2 is a first feature point that is on the first image 501 and that corresponds to M2. A second area to which M2 belongs is R21, and a first area to which N1 belongs is R22. R21 and R22 have different sizes, and the size of R22 is larger than the size of R21. For example, R21 is a square area with a size of 10*10, and R22 is a square area with a size of 20*20. In some embodiments, M2 and N2 may be central points of the square area, or M2 and N2 may be points at the same orientation in the square area. First, the image tracking point obtaining device may divide R22 into multiple reference areas R221; R221 and R21 have the same size, so that an image similarity between R21 and R221 can be calculated conveniently. Secondly, the image similarity between R21 and each R221 is calculated in a traversal manner. Next, if there is a such a first reference area that makes the image similarity between R21 and R221 greater than a second similarity threshold, N2 is determined as a tracking point of the video frame 500. In some embodiments, if there is no such a first reference area that makes the image similarity between R21 and R221 greater than the second similarity threshold, it is determined that N2 is not the tracking point of the video frame 500.

In the embodiment of this application, when it is recognized that a current video frame includes a first image of a target object, the image tracking point obtaining device obtains a second image of the target object and determines a position of a second feature point marked on the second image; a first feature point corresponding to the second feature point is marked on the first image; a first area to which the first feature point belongs in the first image is obtained, and a second area to which the second feature point belongs in the second image is obtained; and the image tracking point obtaining device determines the first feature point as a tracking point of the current video frame when an image similarity between the first area and the second area meets a screening condition. In this way, the tracking point of the current video frame is determined. By comparing the areas to which the two feature points belong, the tracking point of the video frame can be determined more accurately, thereby improving the accuracy of tracking the target object.

Figure 6:
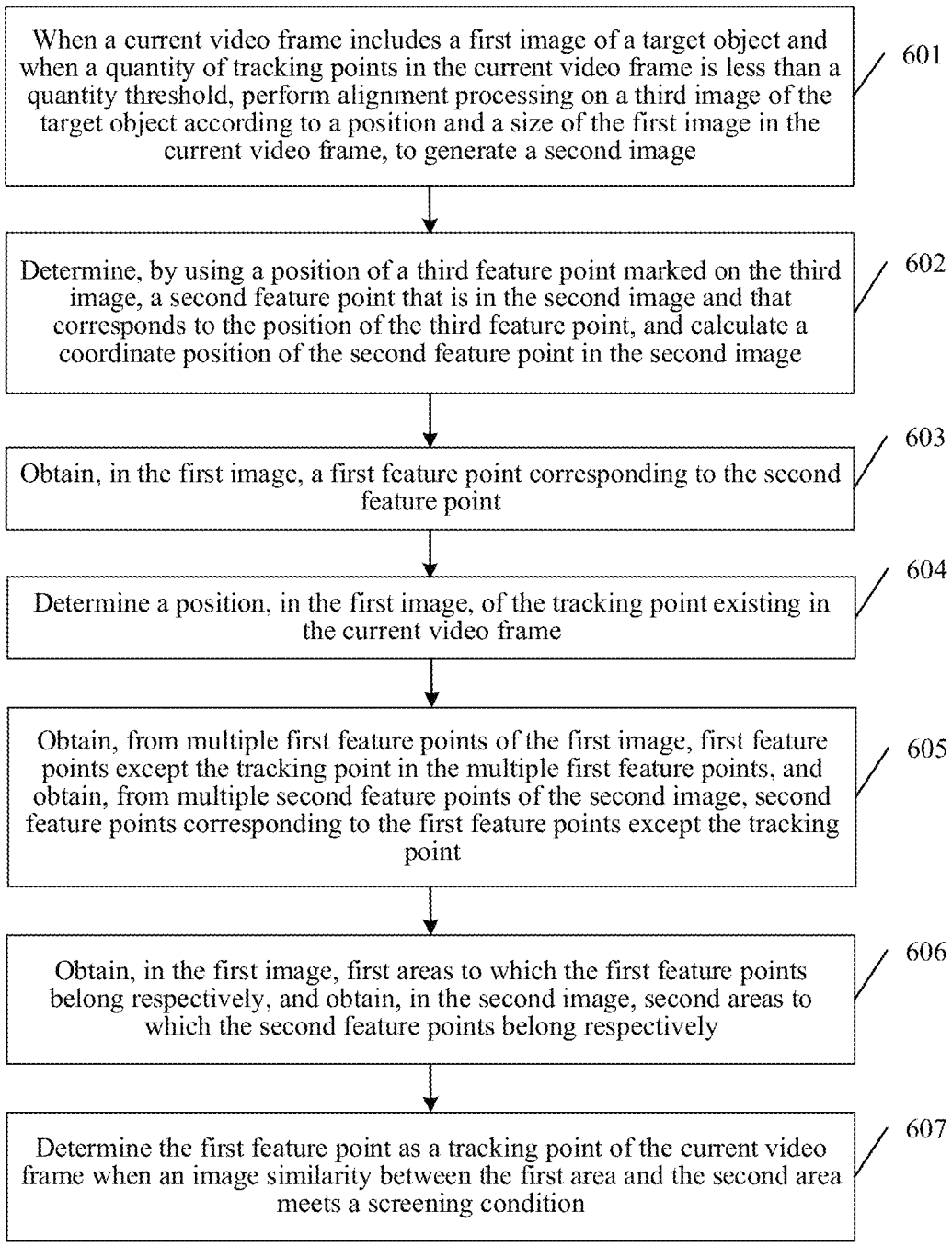
FIG. 6 is a schematic flowchart of another method for obtaining image tracking points according to an embodiment of this application.

FIG. 6 is a schematic flowchart of an method for obtaining image tracking points according to an embodiment of this application. As shown in FIG. 6, the method according to the embodiment of this application may include the following step 601 to step 607.

601: When a current video frame includes a first image of a target object and when a quantity of tracking points in the current video frame is less than a quantity threshold, perform alignment processing on a third image of the target object according to a position and a size of the first image in the current video frame, to generate a second image.

Specifically, when the current video frame includes the first image of the target object and when the quantity of tracking points in the current video frame is less than the quantity threshold, it indicates that there are few tracking points in the current video frame, and the target object cannot be tracked accurately. Therefore, the image tracking point obtaining device obtains the third image of the target object, to supplement the tracking points for the current video frame. The quantity threshold may be customized, which is not limited in the embodiment of this application.

When the quantity of tracking points in the current video frame is not less than the quantity threshold, it indicates that there are many tracking points in the current video frame, and the target object can still be tracked. Therefore, the image tracking point obtaining device does not perform step 601, that is, the tracking points in the current video frame are not supplemented.

Figure 7:
FIG. 7 is a diagram of an example that a quantity of tracking points in a video frame changes according to an embodiment of this application.

For example, FIG. 7 is a diagram of an example that a quantity of tracking points in a video frame changes according to an embodiment of this application. As shown in FIG. 7, the quantity of tracking points in a video frame 1 is 5. As time goes by, the quantity of tracking points in a video frame N becomes 2. If the quantity threshold set by the image tracking point obtaining device is 3, the tracking points of the video frame N need to be supplemented, that is, supplementing the tracking points by obtaining the third image of the target object.

For the specific implementation of "aligning on a third image of the target object according to a position and a size of the first image in the current video frame, to generate a second image" in step 601, reference may be made to the detailed description of step 301 in the embodiment shown in FIG. 3, and details are not described herein again.

In another implementation, if the current video frame is not a video frame in which the target object is recognized for the first time, the image tracking point obtaining device determines, by means of tracking, an alignment process for aligning the third image with the first image. For example, according to the position of the tracking point existing in the current video frame and the position of the third feature point determined in step 601, a homography matrix for aligning the third image, from the current position, with the first image. In this way, after alignment processing is performed on the third image according to the homography matrix, the second image is generated. A size of the second image is the same as the size of the first image, and an angle of the second image is the same as or close to (when there is an error in homography matrix calculation) an angle of the first image in the current video frame.

602: Determine, by using a position of a third feature point marked on the third image, a second feature point that is on the second image and that corresponds to the position of the third feature point, and calculate coordinates of the second feature point in the second image.

603: Mark, in the first image, a first feature point corresponding to the second feature point.

For step 602 and step 603, reference may be made to the detailed description of step 302 and step 303 in the embodiment shown in FIG. 3, and details are not described herein again.

604: Determine a position, in the first image, of the tracking point existing in the current video frame.

Specifically, after determining the position of the first image in the video frame, the image tracking point obtaining device further determines the position of the currently existing tracking point in the first image, so that it can be determined conveniently, according to the position of the first feature point, whether the first feature point is the currently existing tracking point.

605: Obtain, from multiple first feature points of the first image, first feature points except the tracking point in the multiple first feature points, and obtain, from multiple second feature points of the second image, second feature points corresponding to the first feature points except the tracking point.

Specifically, through step 601 to step 603 above, it can be determined that multiple third feature points are marked in the third image. Therefore, multiple second feature points are marked on the second image, and the first image also includes multiple first feature points corresponding to the second feature points. On this basis, the image tracking point obtaining device may determine the position of the tracking point in the first image through step 605, and then compare the position of the tracking point with multiple first feature points, to determine a first feature point at the same position as the tracking point. Because the first feature point at the same position as the tracking point is already determined as the tracking point, it is unnecessary to perform the step of determining whether the first feature point is a tracking point. In this way, the efficiency of determining the tracking point can be improved.

Further, in an optional implementation, when there are at least two tracking points, for one of the tracking points, because the position of one first feature point in the first image is already determined in step 603, the position of the tracking point in the first image is compared with the position of the first feature point in the first image to determine whether the two positions overlap each other. If the positions overlap each other, step 606 and step 607 are not performed on the first feature point. If the positions do not overlap each other, step 606 and step 607 are performed on the first feature point. Comparison between one tracking point and one first feature point is described in detail herein. Comparison between other tracking points and this first feature point may be performed with reference to the method herein, and details are not described herein again.

Further, in the multiple first feature points of the first image, if there are still multiple first feature points after the tracking point is removed, the image tracking point obtaining device separately finds each second feature point corresponding to each first feature point except the tracking point according to a correspondence between the first feature points and the second feature points in step 603.

606: Obtain, in the first image, first areas to which the first feature points belong respectively, and obtain, in the second image, second areas to which the second feature points belong respectively.

607: Determine the first feature point as a tracking point of the current video frame when an image similarity between the first area and the second area meets a screening condition.

For example, in the multiple first feature points of the first image, there are three remaining first feature points after the tracking point is removed, which are N3, N4, and N5 respectively. In the second image, a second feature point corresponding to N3 is M3, a second feature point corresponding to N4 is M4, and a second feature point corresponding to N5 is M5. The image tracking point obtaining device performs step 606 and step 607 specifically in the following manner: for N3 and M3, obtaining a first area R31 to which N3 belongs, and obtaining a second area R32 to which M3 belongs; determining whether an image similarity between the first area R31 and the second area R32 meets a screening condition; if yes, determining the first feature point N3 as a tracking point of the current video frame. For N4 and M4 as well as N5 and M5, step 606 and step 607 may also be performed according to the implementation of step 606 and step 607 performed on N3 and M3, and details are not described herein.

For step 606 and step 607, reference may be made to the detailed description of step 304 and step 305 in the embodiment shown in FIG. 3, and details are not described herein.

In an optional implementation, after the current video frame is obtained and before a next video frame is obtained, when the current video frame includes the first image of the target object and when the quantity of tracking points in the current video frame is less than the quantity threshold, the solution from step of 601 of aligning on a third image of the target object according to a position and a size of the first image in the current video frame to generate a second image to step 607 is performed. This solution does not affect obtaining of the first video frame and can supplement the tracking points in the current video frame, thereby improving processing efficiency of the image tracking point obtaining device.

Figure 8:
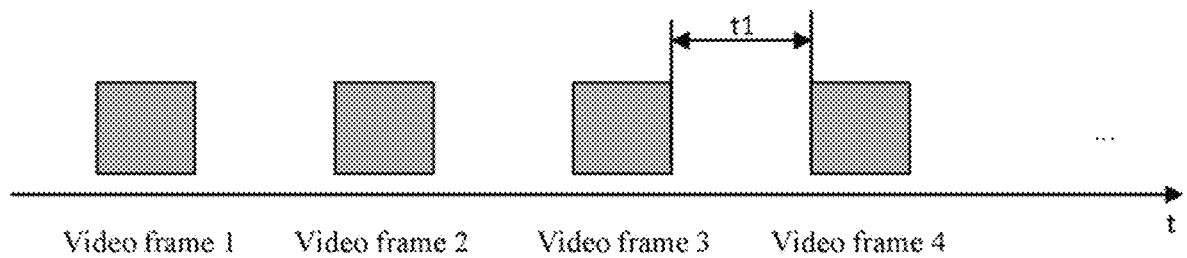
FIG. 8 is a diagram of an example of an method for obtaining image tracking points according to an embodiment of this application.

For example, FIG. 8 is a diagram of an example of an method for obtaining image tracking points according to an embodiment of this application. As shown in FIG. 8, as time t goes by, the image tracking point obtaining device can obtain multiple video frames, for example, a video frame 1, a video frame 2, a video frame 3, and a video frame 4. It takes a certain period of time to obtain each video frame. For example, after the video frame 3 is obtained, it takes a time period t1 to obtain the video frame 4. Therefore, in the time period t1, the image tracking point obtaining device not only can obtain the video frame 4, but also can supplement tracking points for the video frame 3, that is, performs the solution of the embodiment shown in FIG. 6 on the video frame 3.

In the embodiment of this application, when a current video frame includes a first image of a target object and when the quantity of tracking points in the current video frame is less than a quantity threshold, the image tracking point obtaining device obtains a second image of the target object and determines a position of a second feature point marked on the second image; a first feature point corresponding to the second feature point is marked on the first image; a first area to which the first feature point belongs in the first image is obtained, and a second area to which the second feature point belongs in the second image is obtained; and the image tracking point obtaining device determines the first feature point as a tracking point of the current video frame when an image similarity between the first area and the second area meets a screening condition. In this way, when the current video frame includes few tracking points, the tracking points are supplemented. By comparing the areas to which the two feature points belong, the tracking point of the video frame can be determined more accurately, thereby improving the accuracy of tracking the target object.

Figure 9:
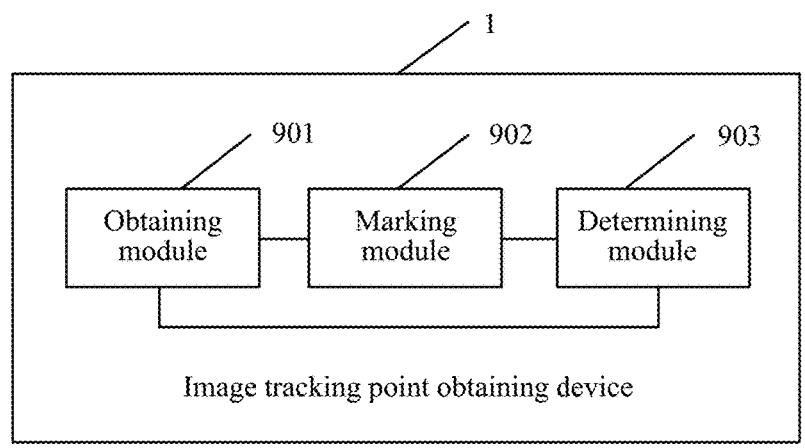
FIG. 9 is a schematic structural diagram of an image tracking point obtaining device according to an embodiment of this application.

FIG. 9 is a schematic structural diagram of an image tracking point obtaining device according to an embodiment of this application. As shown in FIG. 9, the image tracking point obtaining device 1 may include: an obtaining module 901, a marking module 902, and a determining module 903.

The obtaining module 901 is configured to obtain, when a current video frame includes a first image of a target object, a second image of the target object and determine a position of a second feature point marked on the second image.

The marking module 902 is configured to mark, in the first image, a first feature point corresponding to the second feature point.

The obtaining module 901 is further configured to obtain a first area to which the first feature point belongs in the first image, and obtain a second area to which the second feature point belongs in the second image.

The determining module 903 is configured to determine the first feature point as a tracking point of the current video frame when an image similarity between the first area and the second area meets a screening condition.

In one embodiment, in the aspect of obtaining a second image of the target object and determining a position of a second feature point marked on the second image, the obtaining module 901 includes: an image generating unit, configured to perform alignment processing on a third image of the target object according to a position and a size of the first image in the current video frame, to generate the second image; a feature point determining unit, configured to determine, by using a position of a third feature point marked on the third image, the second feature point that is on the second image and that corresponds to the position of the third feature point; and a position calculation unit, configured to calculate coordinates of the second feature point in the second image.

In one embodiment, the image generating unit is specifically configured to: obtain the third image of the target object, and determine the position of the third feature point marked in the third image; determine, according to the position and the size of the first image in the video frame, an alignment process for aligning the third image with the first image; and perform alignment processing on the third image based on the first image and the alignment process, to generate the second image.

In one embodiment, the feature point determining unit is specifically configured to: transform the position of the third feature point according to the alignment process; and mark, in the second image, the second feature point corresponding to the third feature point according to the transformed position.

In one embodiment, in the aspect of determining the position of the third feature point marked in the third image, the image generating unit is specifically configured to: determine positions of multiple reference points in the third image of the target object and a distinction degree of each reference point in the multiple reference points by using a feature point extraction algorithm; and determine a reference point with a highest distinction degree in the multiple reference points as the third feature point, and calculate coordinates of the third feature point in the third image.

In one embodiment, the image generating unit is further configured to remove, from the multiple reference points, the reference point with the highest distinction degree and a reference point whose distance to coordinates of the reference point with the highest distinction degree is less than a pixel threshold, and perform the step of determining a reference point with a highest distinction degree in the multiple reference points as the third feature point, and calculating coordinates of the third feature point in the third image.

In one embodiment, the image generating unit is further configured to adjust a size of the third image of the target object according to a size of the current video frame.

In one embodiment, a size of the first area is equal to a size of the second area; and the determining module 903 is specifically configured to: obtain the image similarity between the first area and the second area; and determine the first feature point as the tracking point of the current video frame if the image similarity between the first area and the second area is greater than a first similarity threshold.

In one embodiment, a size of the first area is greater than a size of the second area; and the determining module 903 is specifically configured to: determine multiple reference areas from the first area, a size of each reference area in the multiple reference areas being equal to the size of the second area; obtain an image similarity between each reference area and the second area; and determine the first feature point as the tracking point of the current video frame if there is a first reference area, of which an image similarity with the second area is greater than a second similarity threshold, in the multiple reference areas.

In one embodiment, in the aspect of obtaining, when a current video frame includes a first image of a target object, a second image of the target object and determining a position of a second feature point marked on the second image, the obtaining module 901 is specifically configured to: obtain the second image of the target object and determine the position of the second feature point marked on the second image when the current video frame includes the first image of the target object and a quantity of tracking points in the current video frame is less than a quantity threshold.

In one embodiment, the determining module 903 is further configured to determine a position, in the first image, of the tracking point existing in the current video frame; and the obtaining module 901 is further configured to obtain, from multiple first feature points of the first image, first feature points except the tracking point in the multiple first feature points, and obtain, from multiple second feature points of the second image, second feature points corresponding to the first feature points except the tracking point; and in the aspect of obtaining a first area to which the first feature point belongs in the first image, and obtaining a second area to which the second feature point belongs in the second image, the obtaining module 901 is specifically configured to: obtain, in the first image, first areas to which the first feature points belong respectively, and obtain, in the second image, second areas to which the second feature points belong respectively.

In one embodiment, in the aspect of obtaining the second image of the target object and determining the position of the second feature point marked on the second image when the current video frame includes the first image of the target object and a quantity of tracking points in the current video frame is less than a quantity threshold, the obtaining module 901 is specifically configured to: obtaining, after the current video frame is obtained and before a next video frame is obtained, the second image of the target object and determine the position of the second feature point marked on the second image when the current video frame includes the first image of the target object and the quantity of tracking points in the current video frame is less than the quantity threshold.

It should be noted that, units performed by the image tracking point obtaining device 1 described in the embodiment of this application and beneficial effects achieved may be specifically implemented according to the steps performed by the image tracking point obtaining device in the method embodiment shown in FIG. 2 to FIG. 8. Details are not described herein again.

An embodiment of this application further provides a computer storage medium. The computer storage medium may store multiple instructions, and the instructions is suitable to be loaded by a processor, so as to perform method steps performed by the image tracking point obtaining device in the embodiment shown in FIG. 2 to FIG. 8. For a specific performing process, reference may be made to the specific description in the embodiment shown in FIG. 2 to FIG. 8. Details are not described herein again.

Figure 10:
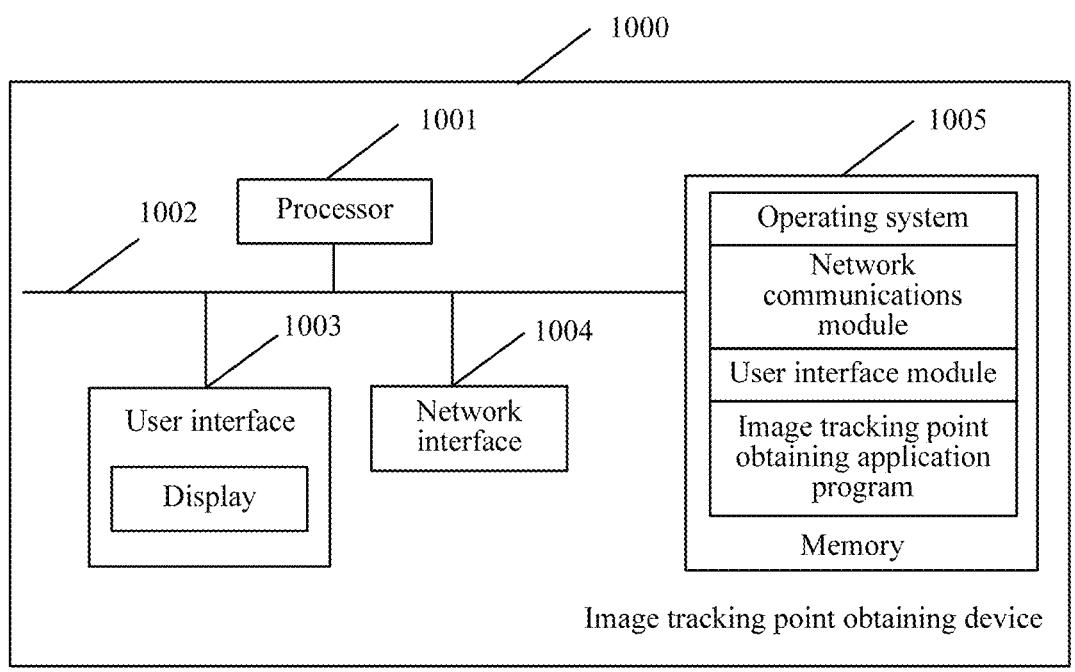
FIG. 10 is a schematic structural diagram of another image tracking point obtaining device according to an embodiment of this application.

Refer to FIG. 10, which is a schematic structural diagram of another image tracking point obtaining device according to an embodiment of this application. As shown in FIG. 10, the image tracking point obtaining device 1000 may include: at least one processor 1001, such as a CPU; a communications interface, where for example, the communications interface includes at least one network interface 1004 and a user interface 1003, a memory 1005, and at least one communications bus 1002. The communications bus 1002 is configured to implement communications between these components. The user interface 1003 may include a display, or the like. In some embodiments, the user interface 1003 may further include a standard wired interface, and a wireless interface. In some embodiments, the network interface 1004 may include a standard wired interface, and a wireless interface (such as a WI-FI interface). The memory 1005 may be a high-speed RAM memory, or may be a non-volatile memory, for example, at least one magnetic disk memory. In some embodiments, the memory 1005 may also be at least one memory apparatus located away from the processor 1001. As shown in FIG. 10, the memory 1005 serving as a computer storage medium may include an operating system, a network communications module, a user interface module, an image tracking point obtaining program application.

In the image tracking point obtaining device 1000 shown in FIG. 10, the user interface 1003 is mainly configured to provide an input interface for a user, for example, obtain an operation instruction of the user for a configuration file. The network interface 1004 is mainly configured to perform data communication with a user terminal. The processor 1001 may be configured to invoke the image tracking point obtaining program application stored in the memory 1005, and specifically perform the following operations: obtaining, when a current video frame includes a first image of a target object, a second image of the target object and determining a position of a second feature point marked on the second image; marking, in the first image, a first feature point corresponding to the second feature point; obtaining a first area to which the first feature point belongs in the first image, and obtaining a second area to which the second feature point belongs in the second image; and determining the first feature point as a tracking point of the current video frame when an image similarity between the first area and the second area meets a screening condition.

In one embodiment, when performing the operation of obtaining a second image of the target object and determining a position of a second feature point marked on the second image, the processor 1001 is specifically configured to: perform alignment processing on a third image of the target object according to a position and a size of the first image in the current video frame, to generate the second image, and determine, by using a position of a third feature point marked on the third image, the second feature point that is on the second image and that corresponds to the position of the third feature point; and calculate coordinates of the second feature point in the second image.

In one embodiment, when performing the operation of aligning on a third image of the target object according to a position and a size of the first image in the current video frame, to generate the second image, the processor 1001 is specifically configured to: obtain the third image of the target object, and determine the position of the third feature point marked in the third image; determine, according to the position and the size of the first image in the video frame, an alignment process for aligning the third image with the first image; and perform alignment processing on the third image based on the first image and the alignment process, to generate the second image.

In one embodiment, when performing the operation of determining, by using a position of a third feature point marked on the third image, the second feature point that is on the second image and that corresponds to the position of the third feature point, the processor 1001 is specifically configured to: transform the position of the third feature point according to the alignment process; and mark, in the second image, the second feature point corresponding to the third feature point according to the transformed position.

In one embodiment, when performing the operation of determining the position of the third feature point marked in the third image, the processor 1001 is specifically configured to: determine positions of multiple reference points in the third image of the target object and a distinction degree of each reference point in the multiple reference points by using a feature point extraction algorithm; and determine a reference point with a highest distinction degree in the multiple reference points as the third feature point, and calculate coordinates of the third feature point in the third image.

In one embodiment, the processor 1001 is further configured to: remove, from the multiple reference points, the reference point with the highest distinction degree and a reference point whose distance to coordinates of the reference point with the highest distinction degree is less than a pixel threshold, and perform the step of determining a reference point with a highest distinction degree in the multiple reference points as the third feature point, and calculating coordinates of the third feature point in the third image.

In one embodiment, before performing the operation of determining positions of multiple reference points in the third image of the target object and a distinction degree of each reference point in the multiple reference points by using a feature point extraction algorithm, the processor 1001 is further configured to: adjust a size of the third image of the target object according to a size of the current video frame.

In one embodiment, a size of the first area is equal to a size of the second area; when performing the operation of determining the first feature point as a tracking point of the current video frame when an image similarity between the first area and the second area meets a screening condition, the processor 1001 is specifically configured to: obtain the image similarity between the first area and the second area; and determine the first feature point as the tracking point of the current video frame if the image similarity between the first area and the second area is greater than a first similarity threshold.

In one embodiment, a size of the first area is greater than a size of the second area; when performing the operation of determining the first feature point as a tracking point of the current video frame when an image similarity between the first area and the second area meets a screening condition, the processor 1001 is specifically configured to: determine multiple reference areas from the first area, a size of each reference area in the multiple reference areas being equal to the size of the second area; obtain an image similarity between each reference area and the second area; and determine the first feature point as the tracking point of the current video frame if there is a first reference area, of which an image similarity with the second area is greater than a second similarity threshold, in the multiple reference areas.

In one embodiment, while performing the operation of obtaining, when a current video frame includes a first image of a target object, a second image of the target object and determining a position of a second feature point marked on the second image, the processor 1001 is specifically configured to: obtain the second image of the target object and determine the position of the second feature point marked on the second image when it is recognized, for the first time, that the current video frame includes the first image of the target object.

In one embodiment, while performing the operation of obtaining, when a current video frame includes a first image of a target object, a second image of the target object and determining a position of a second feature point marked on the second image, the processor 1001 is specifically configured to: obtain the second image of the target object and determine the position of the second feature point marked on the second image when the current video frame includes the first image of the target object and a quantity of tracking points in the current video frame is less than a quantity threshold.

In one embodiment, before performing the operation of obtaining a first area to which the first feature point belongs in the first image, and obtaining a second area to which the second feature point belongs in the second image, the processor 1001 is further configured to: determine a position, in the first image, of the current tracking point in the current video frame; and obtain, from multiple first feature points of the first image, first feature points except the tracking point in the multiple first feature points, and obtain, from multiple second feature points of the second image, second feature points corresponding to the first feature points except the tracking point. The operation of obtaining a first area to which the first feature point belongs in the first image, and obtaining a second area to which the second feature point belongs in the second image includes: obtaining, in the first image, first areas to which the first feature points belong respectively, and obtaining, in the second image, second areas to which the second feature points belong respectively.

In one embodiment, while performing the operation of obtaining the second image of the target object and determining the position of the second feature point marked on the second image when the current video frame includes the first image of the target object and a quantity of tracking points in the current video frame is less than a quantity threshold, the processor 1001 is specifically configured to: obtain, after the current video frame is obtained and before a next video frame is obtained, the second image of the target object and determine the position of the second feature point marked on the second image when the current video frame includes the first image of the target object and the quantity of tracking points in the current video frame is less than the quantity threshold.

For specific implementation of the processor according to the embodiment of this application, reference may be made to the description of the related content in the foregoing embodiment. Details are not described herein again.

A person of ordinary skill can understand that all or some of processes in the methods according to the foregoing embodiments may be implemented by a computer program instructing relevant hardware. The program may be stored in a computer readable storage medium. When executed, the program may include the processes of the embodiments of the foregoing embodiments. The storage medium may be a magnetic disk, an optical disc, a read-only memory (ROM), a random access memory (RAM), and the like.

Disclosed above are merely some embodiments of this application. Definitely, the scope of the claims of this application is not limited thereto. A person of ordinary skill in the art can understand and implement all or some of processes of the foregoing embodiments, and equivalent changes made according to the claims of this application still fall within the scope of the present invention.

What is claimed is:

1. A method for obtaining image tracking points, applied to an image tracking point obtaining device, the method comprising:
   obtaining, when a current video frame comprises a first image of a target object, a second image of the target object;
   determining a position of a second feature point on the second image;
   obtaining, on the first image, a first feature point corresponding to the second feature point;
   obtaining a first area to which the first feature point belongs in the first image, and obtaining a second area to which the second feature point belongs in the second image; and
   determining the first feature point as a tracking point of the current video frame when similarity between the first area and the second area meets a screening condition, wherein the second image is obtained from a third image and aligned with the first image with respect to the target object in the current video frame, and wherein the tracking point is determined by:
      determining the first feature point as the tracking point of the current video frame in response to determining the image similarity between the first area and the second area is greater than a first similarity threshold, wherein the image similarity is calculated by normalized cross correlation (NCC) on grayscale value of a quantity of image pixels.

2. The method according to claim 1, wherein the obtaining a second image of the target object and determining a position of a second feature point on the second image comprises:
   aligning, on the third image of the target object according to a position and a size of the first image in the current video frame, to generate the second image, and determining, by using a position of a third feature point on the third image, the second feature point that is on the second image and that corresponds to the position of the third feature point; and
   calculating coordinates of the second feature point in the second image.

3. The method according to claim 2, wherein the aligning on a third image of the target object according to a position and a size of the first image in the current video frame, to generate the second image comprises:
   obtaining the third image of the target object, and determining the position of the third feature point on the third image;
   determining, according to the position and the size of the first image in the video frame, an alignment process for aligning the third image with the first image; and
   aligning the third image based on the first image and the alignment process, to generate the second image.

4. The method according to claim 3, wherein the determining, by using a position of a third feature point on the third image, the second feature point that is on the second image and that corresponds to the position of the third feature point comprises:
   transforming the position of the third feature point according to the alignment process; and
   obtaining, on the second image, the second feature point corresponding to the third feature point according to the transformed position.

5. The method according to claim 3, wherein the determining the position of the third feature point on the third image comprises:
   determining positions of multiple reference points in the third image of the target object and a distinction degree of each reference point in the multiple reference points by using a feature point extraction algorithm; and
   determining a reference point with a highest distinction degree in the multiple reference points as the third feature point, and calculating coordinates of the third feature point in the third image.

6. The method according to claim 5, further comprising:
   removing, from the multiple reference points, the reference point with the highest distinction degree and a reference point whose distance to coordinates of the reference point with the highest distinction degree is less than a pixel threshold, and performing the step of determining a reference point with a maximum distinction degree in the multiple reference points as the third feature point, and calculating coordinates of the third feature point in the third image.

7. The method according to claim 5, before the determining positions of multiple reference points in the third image of the target object and a distinction degree of each reference point in the multiple reference points by using a feature point extraction algorithm, further comprising:
   adjusting a size of the third image of the target object according to a size of the current video frame.

8. The method according to claim 1, wherein a size of the first area is greater than a size of the second area; and the determining the first feature point as a tracking point of the current video frame when an image similarity between the first area and the second area meets a screening condition comprises:
   determining multiple reference areas from the first area, a size of each reference area in the multiple reference areas being equal to the size of the second area;
   obtaining an image similarity between each reference area and the second area; and
   determining the first feature point as the tracking point of the current video frame if there is a first reference area, of which an image similarity with the second area is greater than a second similarity threshold, in the multiple reference areas.

9. The method according to claim 1, wherein the obtaining, when a current video frame comprises a first image of a target object, a second image of the target object and determining a position of a second feature point on the second image comprises:
   obtaining the second image of the target object and determining the position of the second feature point on the second image when the current video frame comprises the first image of the target object and a quantity of tracking points in the current video frame is less than a quantity threshold.

10. The method according to claim 9, before the obtaining a first area to which the first feature point belongs in the first image, and obtaining a second area to which the second feature point belongs in the second image, further comprising:

determining a position on the first image corresponding to the tracking point existing in the current video frame; and obtaining, from multiple first feature points of the first image, first feature points except the tracking point in the multiple first feature points, and obtaining, from multiple second feature points of the second image, second feature points corresponding to the first feature points except the tracking point, wherein the obtaining a first area to which the first feature point belongs in the first image, and obtaining a second area to which the second feature point belongs in the second image comprises:

obtaining, in the first image, first areas to which the first feature points belong respectively, and obtaining, in the second image, second areas to which the second feature points belong respectively.

11. The method according to claim 9, wherein the obtaining the second image of the target object and determining the position of the second feature point on the second image when the current video frame comprises the first image of the target object and a quantity of tracking points in the current video frame is less than a quantity threshold comprises:

obtaining, after the current video frame is obtained and before a next video frame is obtained, the second image of the target object and determining the position of the second feature point on the second image when the current video frame comprises the first image of the target object and the quantity of tracking points in the current video frame is less than the quantity threshold.

12. An image tracking point obtaining device, comprising a memory and a processor, the memory storing computer readable storage instructions, and when executed by the processor, the computer readable storage instructions causing the processor to perform:

obtaining, when a current video frame comprises a first image of a target object, a second image of the target object;

determining a position of a second feature point on the second image;

obtaining, on the first image, a first feature point corresponding to the second feature point;

obtaining a first area to which the first feature point belongs in the first image, and obtaining a second area to which the second feature point belongs in the second image; and determining the first feature point as a tracking point of the current video frame when an image similarity between the first area and the second area meets a screening condition wherein the second image is obtained from a third image and aligned with the first image with respect to the target object in the current video frame, and wherein the tracking point is determined by:

determining the first feature point as the tracking point of the current video frame in response to determining the image similarity between the first area and the second area is greater than a first similarity threshold, wherein the image similarity is calculated by normalized cross correlation (NCC) on grayscale value of a quantity of image pixels.

13. The image tracking point obtaining device according to claim 12, wherein the obtaining a second image of the target object and determining a position of a second feature point on the second image comprises:

aligning on a third image of the target object according to a position and a size of the first image in the current video frame, to generate the second image, and determining, by using a position of a third feature point on the third image, the second feature point that is on the second image and that corresponds to the position of the third feature point; and calculating coordinates of the second feature point in the second image.

14. The image tracking point obtaining device according to claim 13, wherein the aligning on a third image of the target object according to a position and a size of the first image in the current video frame, to generate the second image comprises:

obtaining the third image of the target object, and determining the position of the third feature point on the third image;

determining, according to the position and the size of the first image in the video frame, an alignment process for aligning the third image with the first image; and aligning the third image based on the first image and the alignment process, to generate the second image.

15. The image tracking point obtaining device according to claim 14, wherein the determining, by using a position of a third feature point on the third image, the second feature point that is on the second image and that corresponds to the position of the third feature point comprises:

transforming the position of the third feature point according to the alignment process; and obtaining, on the second image, the second feature point corresponding to the third feature point according to the transformed position.

16. A non-transitory computer readable storage medium, storing computer readable storage instructions, when executed by one or more processors, the computer readable storage instructions causing the one or more processors to perform:

obtaining, when a current video frame comprises a first image of a target object, a second image of the target object;

determining a position of a second feature point on the second image;

obtaining, on the first image, a first feature point corresponding to the second feature point;

obtaining a first area to which the first feature point belongs in the first image, and obtaining a second area to which the second feature point belongs in the second image; and determining the first feature point as a tracking point of the current video frame when an image similarity between the first area and the second area meets a screening condition wherein the second image is obtained from a third image and aligned with the first image with respect to the target object in the current video frame, and wherein the tracking point is determined by:

determining the first feature point as the tracking point of the current video frame in response to determining the image similarity between the first area and the second area is greater than a first similarity threshold, wherein the image similarity is calculated by normalized cross correlation (NCC) on grayscale value of a quantity of image pixels.

17. The storage medium according to claim 16, wherein the obtaining a second image of the target object and determining a position of a second feature point on the second image comprises:

aligning on a third image of the target object according to a position and a size of the first image in the current video frame, to generate the second image, and determining, by using a position of a third feature point on the third image, the second feature point that is on the second image and that corresponds to the position of the third feature point; and calculating coordinates of the second feature point in the second image.

18. The storage medium according to claim 17, wherein the aligning on a third image of the target object according to a position and a size of the first image in the current video frame, to generate the second image comprises:

obtaining the third image of the target object, and determining the position of the third feature point on the third image;

determining, according to the position and the size of the first image in the video frame, an alignment process for aligning the third image with the first image; and aligning the third image based on the first image and the alignment process, to generate the second image.

19. The storage medium according to claim 18, wherein the determining, by using a position of a third feature point on the third image, the second feature point that is on the second image and that corresponds to the position of the third feature point comprises:

transforming the position of the third feature point according to the alignment process; and obtaining, on the second image, the second feature point corresponding to the third feature point according to the transformed position.

20. The method according to claim 1, further comprising:

locating a first sub-image in the first area and a second sub-image in the second area;

calculate a grayscale correlation value between a first quantity of image pixels in the first sub-image and second quantity of image pixels in the second sub-image; and determining the image similarity between the first area and the second area according to the grayscale correlation value.

* * * * *